US012693844B1

(12) United States Patent
    Automata

(10) Patent No.:     US 12,693,844 B1
(45) Date of Patent:          Jul. 28, 2026

(54) VEHICLE STATE AWARE CLOUD RESOURCE MANAGEMENT

(71) Applicant: Zoox, Inc., Foster City, CA (US)

(72) Inventor: Lilith Rogue Automata, Portland, OR (US)

(73) Assignee: Zoox, Inc., Foster City, CA (US)

( * ) Notice: Subject to any disclaimer, the term of this patent is extended or adjusted under 35 U.S.C. 154(b) by 230 days.

(21) Appl. No.: 18/376,784

(22) Filed: Oct. 4, 2023

(51) Int. Cl.
    *G06F 8/65*          (2018.01)
    *G07C 5/00*          (2006.01)

(52) U.S. Cl.
    CPC .............. *G06F 8/65* (2013.01); *G07C 5/008* (2013.01)

(58) Field of Classification Search
    None
    See application file for complete search history.

(56) References Cited

U.S. PATENT DOCUMENTS

| | | | | |
|---|---|---|---|---|
| 10,042,635 | B2 * | 8/2018 | Moeller ................... | H04L 67/12 |
| 10,649,459 | B2 | 5/2020 | Wang | |
| 11,144,304 | B2 * | 10/2021 | Buecherl ................... | G06F 8/65 |
| 11,782,699 | B1 * | 10/2023 | Meyers ..................... | G06F 8/65 |
| | | | | 717/171 |
| 12,400,005 | B1 * | 8/2025 | DeCapua .............. | G06F 21/577 |
| 2019/0259223 | A1 * | 8/2019 | Sangameswaran .. | G07C 5/0841 |
| 2021/0181758 | A1 | 6/2021 | Das | |

| | | | | |
|---|---|---|---|---|
| 2022/0043459 | A1 * | 2/2022 | Ayers ...................... | H04L 67/12 |
| 2022/0046468 | A1 * | 2/2022 | Altintas ................ | H04L 67/108 |
| 2022/0297635 | A1 * | 9/2022 | Fang ...................... | B60R 25/24 |
| 2022/0374227 | A1 * | 11/2022 | Fox .......................... | G06F 21/57 |
| 2023/0084842 | A1 * | 3/2023 | Ng ........................... | H04W 4/50 |
| | | | | 701/32.7 |
| 2023/0161583 | A1 * | 5/2023 | Fang ..................... | B60R 16/023 |
| | | | | 701/36 |
| 2023/0288489 | A1 * | 9/2023 | Jin ........................... | B60L 3/12 |
| 2024/0246446 | A1 * | 7/2024 | Hassani ................. | B60L 53/65 |

FOREIGN PATENT DOCUMENTS

| | | | | | |
|---|---|---|---|---|---|
| CN | 115617367 | A | * | 1/2023 | .............. G06F 8/65 |
| DE | 102022004038 | A1 | * | 5/2024 | .............. G06F 8/65 |
| JP | 2004139572 | A | * | 5/2004 | .............. H04L 6/561 |
| JP | 2021105923 | A | * | 7/2021 | |

OTHER PUBLICATIONS

U.S. Appl. No. 15/644,349, filed Jul. 7, 2017.

* cited by examiner

*Primary Examiner* — Philip Wang
(74) *Attorney, Agent, or Firm* — Lee & Hayes, P.C.

(57)          ABSTRACT

Mitigating the impact of cloud service downtime, migration to a new cloud instance/container, and/or software update on a vehicle or fleet of vehicles may include receiving an indication that a vehicle is experiencing or is scheduled to experience downtime; determining, based at least in part on the indication, a criterion indicating a minimum vehicle state for the vehicle to be prepared for the downtime; determining, based at least in part on sensor data received by the vehicle, a vehicle state associated with the vehicle; and causing control of the vehicle based at least in part on the criterion and the vehicle state data.

20 Claims, 5 Drawing Sheets

VEHICLE STATE AWARE CLOUD RESOURCE MANAGEMENT

BACKGROUND

Autonomous vehicles may be negatively impacted by any downtime of servers with which autonomous vehicles or autonomous vehicle monitoring or guidance agents communicate. For example, server downtime may cause a momentary (or longer) lapse in a connection between an autonomous vehicle and a remote guidance agent when the autonomous vehicle has requested involvement of the remote guidance agent in helping the autonomous vehicle to navigate a particularly tricky section or roadway. This may cause delays or even safety impacts on the autonomous vehicle's operations. Additionally, software updates may cause similar delays or impacts on the autonomous vehicle's operations.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
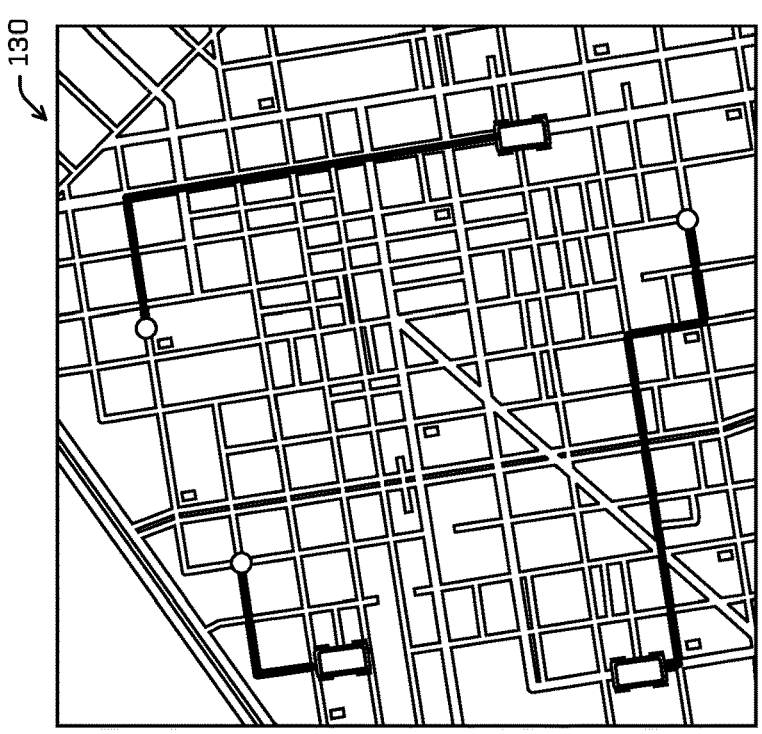
FIG. 1 illustrates an example scenario including a fleet of autonomous vehicles that may be connected to various fleet service(s) provided by a cloud computing system that may be managed by managed and negotiated by a fleet and cloud management backend system.
Figure 1:
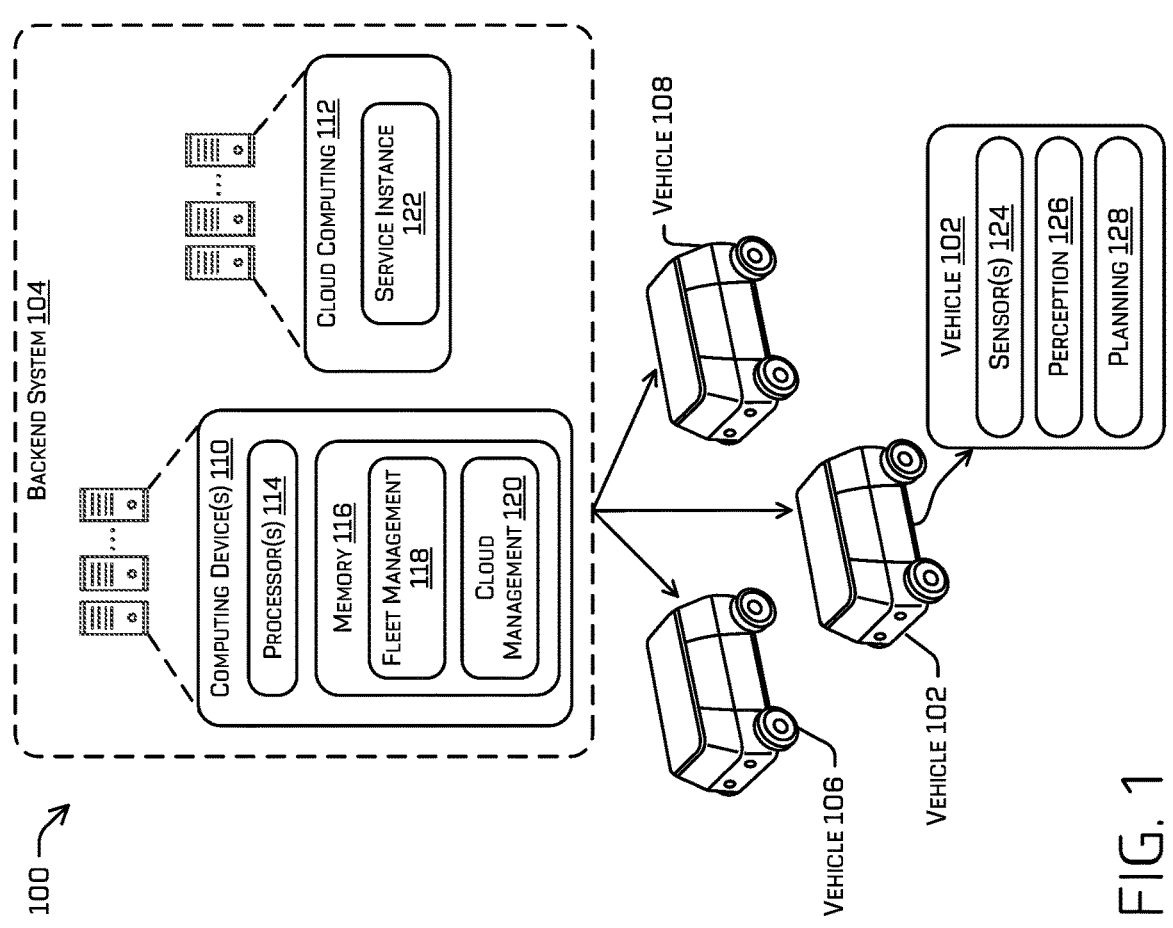

Techniques (e.g., hardware and/or software) for mitigating or entirely preventing any operational or safety impact on autonomous vehicles due to server downtime or vehicle updates may include fleet and cloud management device(s) that may receive an indication that downtime or a vehicle software update is going to occur. For example, the fleet and cloud management device(s) may receive an indication from a cloud computing system that maintenance on one or more servers is going to be conducted or other downtime is expected or has already occurred (e.g., due to a physical problem, like a construction vehicle digging through a networking cable, a hardware problem like a fire or degraded hardware performance, or a software problem like a bug or crash). In such an example, an instance of service(s) hosted by the cloud computing system to which an autonomous vehicle is currently connected may need to be migrated to another instance. In an example where software of the vehicle is scheduled to be updated, the vehicle may lose some or all functionality of one or more components of the vehicle for a time period while the update is installed. Any of these examples may cause situations where the vehicle may temporarily lose functionality (in the case of updates) or connectivity to a service (in the case of cloud computing service downtime), both of which may impact vehicle effectiveness (e.g., accomplishing missions quickly and efficiently) and/or vehicle safety. For example, in a case where a cloud computing system will experience downtime, the vehicles may need to switch connections from a first cloud computing instance to a second cloud computing instance, which may cause a momentary lapse in connection (e.g., 1, 2, 3, 4 seconds or the like) for a variety of services to which a vehicle may be connected.

The fleet and cloud management device(s) may use fleet data received from a fleet of vehicles to determine a first subset of vehicles that is prepared to switch their connections to a new or different instance hosted by the cloud computing system or that is prepared for a software update (e.g., installing a new software component, an updated software component, adding or changing a configuration file, adding or changing a hardware configuration). For this subset of vehicles, the fleet and cloud management device(s) may transmit an instruction to a cloud orchestrator to start a new instance or pod or migrate pod(s) or instance(s) to a new cluster or node, and an instruction to the first subset to connect to the new cluster or node, or transmit an instruction to install the software, in an example where a software update is being rolled out. In a software update example, the fleet and cloud management device(s) may conduct rolling installation instructions, such that the fleet and cloud management device(s) may transmit an instruction to install the software to a smaller subset of the first subset, receive fleet data from the smaller subset indicating characteristics of the installation (e.g., installation success/failure, installation time) and/or performance metric(s) of the smaller subset after the installation before repeating the process with a new subset of the first subset. In this manner, the fleet and cloud management device(s) may mitigate the impact of any software bugs and/or may use the installation data to better predict a risk score and/or estimated downtime associated with the update. The fleet and cloud management device(s) may use this risk score and/or estimated downtime to more accurately determine a subset of vehicles that is currently prepared to install the software update. Additionally or alternatively, a vehicle may use the risk score and/or estimated (installation) downtime to determine the vehicle's preparedness to install the update and/or to mitigate risk associated with the downtime by controlling the vehicle according to the techniques discussed herein for mitigating the risk.

In some examples, determining that a vehicle is prepared for downtime or an update may comprise the fleet and cloud management device(s) using the fleet data to determine and/or the vehicle using sensor data and/or map data to determine one or a combination of factors:

the vehicle is stopped (e.g., at a safe location as discussed below);

the vehicle is parked;

the vehicle is scheduled to stop within a time period (e.g., at a safe location before the downtime starts);

the vehicle is not carrying a passenger;

the vehicle is not streaming data to or receiving data from one or more services hosted by the first cloud instance;

less than a threshold number of objects or less than a threshold number of objects having a specific object classification have been detected by the vehicle;

a configuration and/or software version of the vehicle is associated with a rate of teleoperator requests per mile or time that is less than a threshold rate of teleoperator requests;

a time of day and/or an identification of a component to be updated (e.g., updating a long-wave infrared sensor at night may require finding a location to stop that won't obstruct traffic, whereas updating such a sensor during the day could be done anywhere); and/or the vehicle is located outside a region (e.g., a region identified in map data based at least in part on previous sensor data, fleet data, an indication received from a teleoperations device, a region associated with less than a threshold number or density of objects or objects of a particular classification; or the like).

In some examples, the vehicle and/or the fleet and cloud management device(s) may determine that the vehicle is at a safe location by determining that the vehicle is stopped or capable of stopping (within a time period before the start of the downtime) in a parking space, an area outside a main roadway such as a roadway shoulder, a traffic light controlled intersection, at a passenger pickup/drop-off point, or the like. Additionally or alternatively, the fleet and cloud management device(s) may instruct the vehicle to conduct a network switchover to a new cloud instance or to update a component of the vehicle once the vehicle determines that the vehicle is at a safe location, as may be determined by the criteria discussed herein. Additionally or alternatively, what qualifies as a safe location may be based at least in part on the risk score and/or estimated downtime determined by the fleet and cloud management device(s). For example, in an example where computing service downtime will result in simply switching connections at the vehicle to a different cloud cluster or node, the estimated downtime may be low (e.g., 1 or 2 seconds) and/or the risk score may be lower than risk scores associated with other downtime causes. In such an example, the vehicle may be determined to be prepared for the downtime if it is stopped at a stoplight. Whereas, if the estimated downtime is longer or the risk score is higher, being stopped at a stop light or pulled over on a shoulder may not be sufficient to determine the vehicle is prepared.

In some examples, the fleet and cloud management device(s) may determine a criteria based at least in part on the downtime indication, wherein the criteria indicates a rule set for identifying vehicle preparedness based at least in part on a vehicle state, which may be based at least in part on sensor data, map data, and/or the like. For example, the criteria may specify any of the factors discussed above, such as where the vehicle is stopped, what map feature(s) are associated with that location, what object(s) are detected near the vehicle, and/or the like. In some examples, the criteria may specify a combination of the factors discussed above for determining whether a vehicle is prepared.

In examples where a region of an environment may be used as part of determined whether a vehicle is prepared for downtime, the region may be determined based at least in part on fleet data comprising one or more vehicle(s) detecting at least a threshold number of objects within the region, an object having a particular classification within the region within a time period, at least a threshold number of teleoperation requests originating from vehicles within the region, or the like; event data associated with the region; a rule of the road associated with the region and a time of day/day of the week or year/etc; a map portion identified as requiring teleoperation assistance; etc. To give some practical examples, the region may identify a construction zone, a region around a concert house during hours before and after a concert, a region comprising more than a threshold number of pedestrians and/or cyclists, a region in which more than an average number of teleoperation requests have originated from vehicles within the region, etc.

The fleet and cloud management device(s) may additionally or alternatively determine a second subset of the vehicles that are not prepared for the downtime. For example, a vehicle of the second subset of vehicles may not satisfy a combination of factors identified by a criteria, the vehicle state associated with the vehicle does not indicate a vehicle state that matches a factor indicating vehicle preparedness (e.g., the factor may be associated with a risk score associated with the particular, the vehicle cannot achieve a vehicle state matching a factor before the estimated start of the downtime, and/or the like. The fleet and cloud management device(s) may request the vehicle to generate or the vehicle may independently generate an estimated time at which the vehicle will be prepared for downtime, such as by estimating the time it would take to reach and/or stop in a safe location, whether reaching and/or stopping in the safe location satisfies a factor and/or criteria that may be determined based at least in part on a risk score and/or estimated downtime, and/or the like.

Based at least in part on determining the existence of the second subset of vehicles, the fleet and cloud management device(s) may delay an update for the second subset until individual vehicle(s) of the second subset are prepared for the update, as defined above. For maintenance and/or general server downtime, the fleet and cloud management device(s) may transmit, to a cloud orchestrator, a request to delay shutting down a container or instance based at least in part on receiving an indication from a vehicle that the vehicle isn't prepared for the downtime. In some examples, such a vehicle may be in a more safety critical situation involving the services hosted by the cloud computing instance. The fleet and cloud management device(s) may additionally or alternatively specify, in the request to delay the downtime, the risk score associated with the downtime indication, which may be additionally or alternatively based on the vehicle's state. Additionally or alternatively, the fleet and cloud management device(s) may transmit an estimated time until the vehicle or the second subset is prepared for the downtime.

The estimated time may be determined based at least in part on a maximum time until a vehicle of the second subset estimates it will be prepared for the downtime, an average or median of such times indicated by vehicles of the second subset, and/or the like. In many cases the downtime may be pushed back based on such an indication or until all vehicles of the second subset are prepared. However, the cloud computing service may determine, by one or more of a variety of metrics, that the downtime cannot wait or has already occurred (such as when someone accidentally cuts through a fiber optic cable). Such variety of metrics may include, for example, jitter, packet loss, signal-to-noise ratio (SNR), ping, disk errors, bandwidth, hop count, temperature, and/or the like that may indicate an imminent problem or an issue that has already occurred, whether the cause is known or not. Moreover the downtime or imminent downtime (as may be determined from the various metric(s)) may be determined solely at the cloud computing system, between the cloud computing system and vehicle backend server(s), between vehicle backend server(s) and network interconnect(s) (e.g., cell towers, network edge devices) with a portion of a fleet of vehicles, between those network interconnect(s) and a portion of the fleet, and/or the like. In some examples, the fleet and cloud management device(s)

may transmit an estimated time until the downtime to the fleet of vehicles or at least the second subset of vehicles. A vehicle may use this estimated time and additionally or alternatively a risk score, estimated duration of the downtime, and/or criteria for determining preparedness for the downtime to determine an operation for controlling the vehicle. For example, the vehicle may use the estimated time until the downtime to determine an operation for satisfying a factor or criteria to be prepared for the downtime or an operation that is associated with a greatest safety score, from among multiple operations and their respective safety score.

In some examples, the fleet and cloud management device(s) may transmit instructions to a vehicle to execute an installation of a software update or to switch their connection to a new cloud cluster or node as vehicles of the second subset indicate they are prepared. For those examples where delay is not possible and downtime has already occurred or will occur at a set time, the fleet and cloud management device(s) may send such instructions at or around (within a time tolerance, such as within a difference attributable to ping) the time the downtime is scheduled to occur or immediately if the downtime has already occurred, such as when a hardware, networking, or software failure has already occurred or demonstrates instability indicative of an imminent failure.

In some examples, the services with which a vehicle may be connected and may stream data to or may receive data from may include a teleoperations system to which the vehicle may stream sensor data, perception data, and/or the like and in additional or alternate examples may receive guidance from the teleoperations system (although in some cases, a teleoperator at a teleoperations device may merely observe the vehicle's operations to ensure they are safe and efficient); a ride management system for scheduling, coordinating, and/or routing vehicle missions and/or passenger feedback and/or requests for assistance or; a vehicle log data management system (e.g., for machine-learned model training and/or refinement, component testing, mapping); a mapping component for generating updated map(s) based at least in part on sensor data; an event management system; and/or the like.

The techniques discussed herein may increase the safety of an autonomous vehicle preventing a software update or downtime occurring when a vehicle is in an unsafe location and/or configuring the vehicle with sufficient hardware, software, and/or coordination with the cloud to ensure the vehicle can mitigate the impact for cloud downtime that cannot be delayed or has already occurred. The techniques may also increase the amount or percentage of time service(s) hosted by a cloud computing system are available to autonomous vehicles, thereby increasing vehicle monitorability, the availability of fallback/redundancy for vehicle services, the availability of vehicle teleoperations and/or mission control, and/or the like.

Example Scenario

FIG. 1 illustrates an example scenario 100 including a vehicle 102 and a backend system 104. The vehicle 102 may be part of a fleet of vehicles comprising two or more vehicles. For example, the fleet may additionally include vehicle 106 and/or vehicle 108 (and/or additional vehicles, such as tens, hundreds, or thousands of additional vehicles). In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like.

In some examples, the backend system 104 may comprise computing device(s) 110 and/or cloud computing system 112. The computing device(s) 110 may be one or more computing device(s) that manage vehicle interaction(s) with one or more services hosted by the cloud computing system 112 and/or may manage service(s) hosted by the cloud computing system 112. The computing device(s) 110 may comprise processor(s) 114 and/or a memory 116. The memory 116 may store a fleet management component 118 and/or a cloud management component 120, which may be executed by the processor(s) 114. In some examples, the computing device(s) 110 may manage a fleet of one or more vehicles and/or receive fleet data from the fleet of vehicles using the fleet management component 118. The computing device(s) 110 may additionally or alternatively comprise a cloud management component 120 for managing (e.g., creating, migrating, configuring, and the like) containers, instances, pods, clusters, and/or the like in the cloud computing system 112. In some examples, the fleet management component 118 and/or the cloud management component 120 may conduct the techniques discussed herein for interfacing the fleet with services hosted by the cloud computing system 112 to which one or more vehicle(s) of the fleet may connect, such as service instance 122.

In some examples, the service instance 122 may comprise one or more container(s) or other software components to which one or more vehicles of the fleet may connect via a network for a variety of purposes, depending on the hosted instance. For example, the service instance 122 may comprise a teleoperations component that may provide observation and/or guidance for a vehicle, a ride management component that may assign and/or track a mission for a vehicle, a log data management component that may receive log data from a vehicle, and/or the like. The fleet management component 118 may ensure that a vehicle is prepared for downtime or an update, provide data to a vehicle to mitigate the impact of downtime or an update, and/or may interface with the cloud management component 120 to ensure that downtime of a service instance 122 or hardware upon which the service instance 122 is running does not impact any vehicles of the fleet or minimizes any impact on any vehicle of the fleet. FIG. 1 includes an example representation 130 of a top down view of fleet data received by three vehicles of a fleet and/or ride management data specifying mission objectives, such as termination point(s) for the vehicles, depicted as circles. The ride management data further identifies a current route of each vehicle in a bolded line.

A vehicle 102 of the fleet of vehicles may comprise sensor(s) 124, a perception component 126, and/or a planning component 128. In some examples, the perception component 126 and/or planning component 128 may be stored on a memory of the vehicle and executed by one or more processors of the vehicle. The vehicle 102 may receive sensor data from sensor(s) 124 of the vehicle 102. For example, the sensor(s) 124 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 124 on the vehicle 102 and in a simulation, one or more of sensor(s) 1020 may be simulated. In some examples, the position of a simulated sensor may correspond with a relative position of one of the sensor(s) 124 to the vehicle 102.

The sensor(s) 124 may generate sensor data, which may be received by computing device(s) 110 associated with the vehicle 102. However, in other examples, some or all of the sensor(s) 124 and/or computing device(s) 110 may be separate from and/or disposed remotely from the vehicle 102 and data capture, processing, commands, and/or controls may be communicated to/from the vehicle 102 by one or more remote computing devices via wired and/or wireless networks. For example, the vehicle 102 may transmit sensor data, perception data, and/or planning data to a service instance 122 and/or may receive data from the service instance 122. In some examples, the cloud management component 120 may determine a connection by which the vehicle 102 is to connect to the service instance 122 and the fleet management component 118 may transmit instructions sufficient to connect to the service instance 122 to the vehicle 102.

Computing device(s) of the vehicle 102 may comprise a memory storing a perception component 126 and/or a planning component 128. Note that, in some examples, the computing device(s) of the vehicle 102 may additionally or alternatively store a prediction component, map data, logging component, and/or localization component to name a few of the other components that may be stored and executed by the vehicle 102. The prediction component may be part of the perception component 126 and it may determine a predicted position, orientation, velocity, acceleration, and/or state (e.g., aperture state, blinker state) associated with an object. The localization component may comprise software and/or hardware system(s) for determining a pose (e.g., position and/or orientation) of the vehicle 102 relative to one or more coordinate frames (e.g., relative to the environment, relative to a roadway, relative to an inertial direction of movement associated with the autonomous vehicle). The localization component may output at least part of this data to the perception component 126, which may output at least some of the localization data and/or use the localization data as a reference for determining at least some of the perception data.

In general, the perception component 126 may determine what is in the environment surrounding the vehicle 102 according to information received from the localization component and/or the perception component. The prediction component, the localization component, the perception component 126, and/or the planning component 128 may include one or more machine-learned (ML) models and/or other computer-executable instructions.

In some examples, the localization component and/or the perception component 126 may receive sensor data from the sensor(s) 124. In some examples, the localization component and/or perception component 126 may comprise a pipeline of hardware and/or software, which may include one or more GPU(s), ML model(s), Kalman filter(s), and/or the like. In some instances, the perception component 126 may determine data related to objects (or simulated objects) in the vicinity of the vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), map data that identifies characteristics detected in proximity to the vehicle (e.g., locations and/or dimensions of the roadway, roadway classification(s) (e.g., directionality associated with a portion of the roadway, crosswalk locations, controlled intersection type, signage type and location), buildings, trees, fences, fire hydrants, and any other feature detectable in various sensor modalities), etc. A classification determined by the perception component 126 may indicate a static classification associated with the object (e.g., vehicle, pedestrian, cyclist, signage, construction zone, construction vehicle) and/or a dynamic classification associated with the object (e.g., left turn indicator on, in/out of roadway, passenger loading/unloading, door/aperture open/closed, green/yellow/red light). The data produced by the perception component 126 may be collectively referred to as "perception data." Once the perception component 126 has generated perception data, the perception component 126 may provide the perception data to the planning component 128.

When a perception component 126 detects an object, the perception component 126 may generate an object detection, which may comprise a data structure indicating one or more characteristics of the object. For example, the object detection may indicate a region of interest (ROI) associated with the object detection (e.g., a bounding box, mask, or other indication of a portion of sensor data associated with the object); instance segmentation; semantic segmentation; a volume or area occupied by the object; a pose (e.g., position and/or orientation); velocity; acceleration; classification (e.g., vehicle, pedestrian, articulating vehicle, signage); track; confidence score(s) that any such data is accurate; etc. associated with the object. The perception component 126 may associate an object detection with a track, which may indicate that the object has been previously detected and may comprise historical perception data and/or predicted perception data associated with the object. For example, the track may associate one or more object detections associated with a same object but different times. In some examples, the track may indicate a current, historical, and/or predicted position, orientation, velocity, acceleration, and/or state associated with an object.

In some examples, the perception component 126 may comprise a prediction component that determines predicted data associated with an object, such as a predicted future position, orientation, velocity, acceleration, state, or the like. This predicted data and/or historical data associated with an object may be amalgamated with the current object detection data as a track in association with the object. In some examples, the prediction data may be additionally or alternatively based at least in part on map data or other data. In some examples, the prediction data may comprise a top-down segmentation of the environment, as described in more detail in U.S. Pat. No. 10,649,459, filed Apr. 26, 2018, which is incorporated by reference in its entirety for all purposes herein, and/or a top-down prediction associated with the environment, as described in more detail in U.S. Patent Application Publication No. 2021-0181758, filed Jan. 31, 2020, which is incorporated by reference in its entirety for all purposes herein. In some examples, the prediction data generated by such a prediction component may be part of the perception data.

The planning component 128 may determine a trajectory for controlling the vehicle based at least in part on the perception data and/or localization data (e.g., where the vehicle 102 is in the environment relative to a map and/or features detected by the perception component 126). For example, the planning component 128 may determine a route for the vehicle 102 from a first location to a second location; generate, substantially simultaneously and based at least in part on the perception data, a plurality of potential trajectories for controlling motion of the vehicle 102 in accordance with a receding horizon technique (e.g., 1 microsecond, half a second, 4 seconds, 8 seconds, and the like) to control the vehicle to traverse the route (e.g., in order to avoid any of the detected objects); and select one of the potential trajectories as a trajectory that the vehicle 102 may use to generate a drive control signal that may be transmitted to drive components of the vehicle 102.

The trajectory may indicate a position, heading, velocity, and/or acceleration, although the trajectory itself may comprise instructions for a controller, which may, in turn, actuate a drive system of the vehicle 102. For example, the trajectory may comprise instructions for controller(s) of the vehicle 102 to actuate drive components of the vehicle 102 to effectuate a steering angle and/or steering rate, which may result in a vehicle position, vehicle orientation, vehicle velocity, and/or vehicle acceleration indicated by the trajectory. The trajectory may comprise a target heading, target steering angle, target steering rate, target position, target velocity, and/or target acceleration for the controller(s) to track over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters).

In some examples, a logging component of the vehicle 102 may determine log data comprising sensor data, perception data, scenario data, and/or planning data to store and/or transmit to the backend system 104 (e.g., to the computing device(s) 110 and/or the service instance 122), as well as any other message generated and or sent by the vehicle 102 during operation including, but not limited to, control messages, error messages, etc.

Example System

Figure 2:
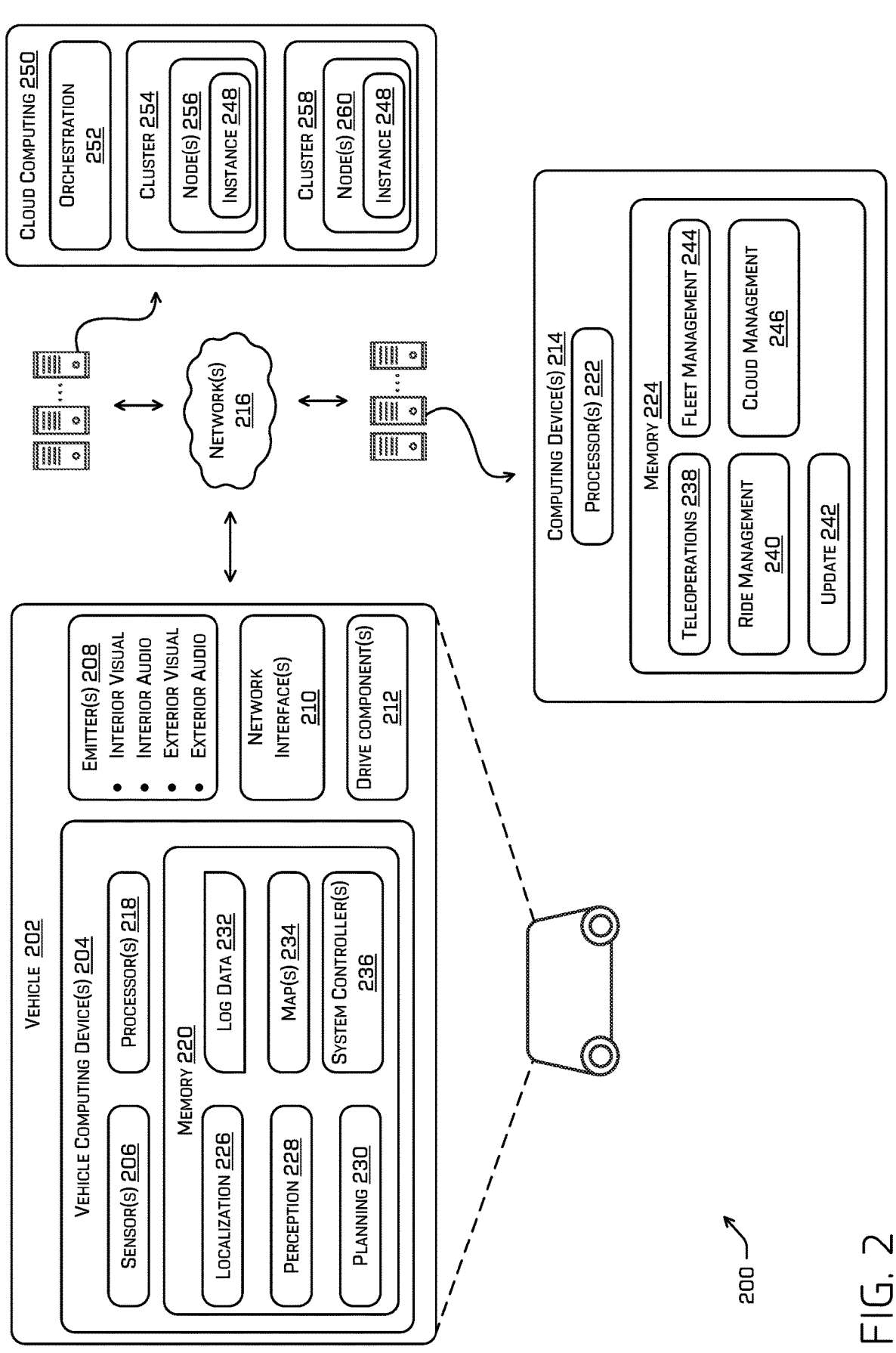
FIG. 2 illustrates a block diagram of an example architecture for mitigating the impact of cloud service downtime or vehicle updates.

FIG. 2 illustrates a block diagram of an example system 200 that implements the techniques discussed herein. In some instances, the example system 200 may include a vehicle 202, which may represent the vehicle 102 in FIG. 1 (or any of the vehicles in a fleet of vehicles). In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 110 and sensor(s) 206 may represent sensor(s) 124. The system 200 may additionally or alternatively comprise computing device(s) 214 and/or cloud computing system 250.

In some instances, the sensor(s) 206 may represent sensor(s) 124 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s), such as computing device(s) 214 and/or cloud computing system 250. In some examples, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals). The network interface(s) 210 may additionally or alternatively enable the vehicle 202 to communicate with computing device(s) 214.

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 2G, 3G, 4G, 4G LTE, 5G, etc.), or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Computing device(s) 214 may also include processor(s) 222 and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media that may store processor-executable instructions. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, log data 232, map(s) 234, and/or system controller(s) 236—zero or more portions of any of which may be hardware, such as GPU(s), CPU(s), and/or other processing units. Perception component 228 may represent perception component 126 and planning component 230 may represent planning component 128. In some examples, memory 224 may further store a teleoperations component 238, ride management component 240, update component 242, fleet management component 244, and/or cloud management component 246. Fleet management component 244 may represent fleet management component 118 and cloud management component 246 may represent cloud management component 120.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment, such as map(s) 234, and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component 226 may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 202, and/or the like In some instances, the localization component 226 may provide data to various components of the vehicle 202 to determine an initial position of an autonomous vehicle for generating a trajectory and/or for generating map data. In some examples, localization component 226 may provide, to the perception component 228 and/or planning component 230 a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, acceleration, and/or other state associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the position(s), orientation(s), velocity(ies), acceleration(s), and/or other states of the objects and/or map data in the environment. For example, the top-down representation may be an image with additional data embedded therein, such as where various pixel channel values encode the perception data and/or map data discussed herein. Data determined by the perception component 228 is referred to as perception data.

The prediction component (of the perception component 228 or as an entirely separate component) may predict a future state of an object in the environment surrounding the vehicle 202. The future (predicted) state may indicate a predicted object position, orientation, velocity, acceleration, and/or other state (e.g., door state, turning state, intent state such as signaling turn) of a detected object. Data determined by the prediction component is referred to as prediction data and may be part of the perception data. In some examples, the prediction component may determine a top-down representation of a predicted future state of the environment. For example, the top-down representation may be an image with additional data embedded therein, such as where various channel pixel values encode the prediction data discussed herein.

The planning component 230 may receive a location and/or orientation of the vehicle 202 from the localization component 226 and/or perception data from the perception component 228 and may determine instructions for controlling operation of the vehicle 202 based at least in part on any of this data. In some examples, the memory 220 may further store map(s) 234 and this map data may be retrieved by the planning component 230 as part of generating environment state data. In some examples, determining the instructions may comprise determining the instructions based at least in part on a format associated with a system with which instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith).

In some examples, the log data 232 may comprise sensor data, perception data, and/or planning data collected/determined by the vehicle 202 (e.g., by the perception component 228), as well as any other message generated and or sent by the vehicle 202 during operation including, but not limited to, control messages, error messages). In some examples, the vehicle 202 may transmit the log data 232 to the computing device(s) 214 and/or cloud computing system 250.

In some examples, the map(s) 234 may comprise a two-dimensional or three-dimensional representation of the environment, characteristic(s) associated therewith, and/or embedding(s). A two-dimensional representation may include, for example, a top-down representation of the environment and a three-dimensional representation may comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 202; and/or the like. The occlusion data may further indicate occlusions to different classes of sensors, such as portion(s) of the environment occluded to visible light cameras but not to radar or lidar, for example. The two-dimensional representation and/or three-dimensional representation may have embeddings associated therewith that encode this data via the learned process discussed herein. For example, for a three-dimensional representation of the environment comprising a mesh, an embedding may be associated with a vertex of the mesh that encodes data associated with a face that may be generated based on one or more vertices associated with the face. For a two-dimensional representation of the environment an edge or other portion of the top-down representation may be associated with an embedding.

The memory 220 and/or 224 may additionally or alternatively store a mapping system, a planning system, a ride management system, simulation component, a logging component that aggregates the log data 232 from output(s) of respective components of the vehicle 202, etc.

As described herein, the localization component 226, the perception component 228, the planning component 230, and/or other components of the system 200 may comprise one or more ML models. For example, localization component 226, the perception component 228, and/or the planning component 230 may each comprise different ML model pipelines. In some examples, an ML model may comprise a neural network. An exemplary neural network is an algorithm that passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatter-plot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236 (which may be a portion of the drive component(s)), which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the localization component 226 and/or perception component 228 and transmit the instructions to the system controller(s), which may control operation of the vehicle 202 based at least in part on the instructions.

In some examples, memory 224 may store a teleoperations component 238, ride management component 240, update component 242, fleet management component 244, and/or cloud management component 246. In some examples, teleoperations component 238, ride management component 240, and/or update component 242 may be examples of services that may be hosted by cloud computing system 250 and may interact with the vehicle 202 via the network(s) 216, such as via API calls from the vehicle 202 to the respective service and/or data transmitted between the vehicle 202 and the respective service.

For example, the vehicle 202 may encounter a scenario that the vehicle 202 may fail to generate a trajectory for that has a confidence score that meets or exceeds a threshold, in which case the vehicle 202 may transmit a request to the teleoperations component 238 (hosted on an instance or container in the cloud computing system 250) for guidance. The teleoperations component 238 may include hardware and/or software for providing instructions and/or feedback to the vehicle 202, as discussed in more detail in U.S. patent application Ser. No. 15/644,349, filed Jul. 7, 2017, the entirety of which is incorporated by reference herein for all purposes. The teleoperations component 238 may present a user interface (e.g., a graphical user interface, an auditory interface, a tactile feedback component) to a teleoperator (e.g., a human user, an artificial intelligence component) that comprises sensor data, perception data, a representation of the environment, sensor data, and/or perception data.

In some examples, the ride management component 240 may receive fleet data from one or more vehicles indicating passenger occupancy of a vehicle, a current route of the vehicle, a current pickup or drop-off point assigned to the vehicle, feedback from a passenger of the vehicle, and/or the like. The ride management component 240 may additionally or alternatively assign a mission to a vehicle (e.g., a pickup and/or drop-off point, number of passengers to pickup and/or drop-off, and/or the like), transmit an altered route to the vehicle, and/or the like.

In some examples, the update component 242 may manage updated or new software components that are to be transmitted to a vehicle for installation by the vehicle. For example, a software developer may upload a software component to the update component 242 for transmission to one or more vehicles of a fleet.

Note that the teleoperations component 238, ride management component 240, and/or update component 242 are merely non-limiting examples of different services that may interact with one or more vehicles of the fleet, which may include transmitting data to and/or receiving data from one or more vehicles of the fleet to accomplish the various functionalities of the respective services. There may be more or less service(s) to which a vehicle connects, such as a log component that receives and stores log data from one or more vehicles of a fleet for use in simulation and/or machine-learned model training or refines, a mapping component that receives log data from one or more vehicles of a fleet to generate an updated map of an environment and transmit an updated map to one or more vehicles of the fleet, an event component that may receive log data from one or more vehicles of the fleet and/or data from an Internet source and that may provide an indication of a temporary event associated with the environment to one or more vehicles of the fleet (e.g., a concert, a construction zone, a riot or demonstration, a disaster zone, a fire), and/or the like. In some examples, any of these services may be a software application that may be hosted by an instance or container in the cloud computing system 250 and run on hardware in the cloud computing system 250.

Moreover, although such services are depicted as being stored in memory 224, the versions of the services stored at the memory 224 may software images of the services that aren't accessed by the vehicles, although in additional or alternate examples, the computing device(s) 214 may host any of the service(s), in which case the vehicle(s) may connect to those service(s) hosted on the computing device(s) 214. The computing device(s) 214 may be an on-premises or remotely hosted computing system for developing and/or managing images of the services' software applications run in the cloud computing system 250.

In some examples, the fleet management component 244 may receive fleet data from one or more vehicles of the fleet and may transmit downtime and/or update-related data to one or more vehicle(s) of the fleet to mitigate the impact of downtime or an update. The fleet management component 244 may additionally or alternatively transmit indication(s) received by from one or more vehicle(s) of the fleet, such as indications of preparedness or unpreparedness for downtime or an update, to the cloud management component 246.

In some examples, the cloud management component 246 may receive fleet data from the fleet management component 244 and may use such data to request a delay in a migration of services by the cloud computing system 250, determine a subset of vehicles of the fleet that are prepared for downtime or an update and may cause that subset of vehicles to connect to a new or migrated instance, and/or the like. In some examples, the cloud management component 246 may receive an indication that downtime has or will occur from the cloud computing system 250. For example, the cloud management component 246 may comprise a cloud computing system 250 monitor that determines metric(s) associated with the cloud computing system 250, a cluster thereof, and/or a node thereof, and/or metric(s) associated with different hardware and/or network connection(s) (e.g., a network connection between the vehicle and edge networking (e.g., a cell tower), between the edge networking and the computing device(s) 214 and/or cloud computing system 250, between the cloud computing system 250 and the computing device(s) 214). Such metric(s) may include, for example, jitter, packet loss, signal-to-noise ratio (SNR), ping, disk errors, bandwidth, hop count, temperature, and/or the like that may indicate an imminent problem or an issue that has already occurred, whether the cause is known or not.

In some examples, various operations discussed herein may comprise the cloud management component 246 transmitting various requests to an orchestration component 252 of the cloud computing system 250. In some examples, the orchestration component 252 may comprise a platform for instantiating, migrating, terminating, and/or otherwise managing one or more instance(s) in the cloud computing system 250 for running software application(s) of the services. For example, the orchestration component 252 could include Kubernetes, Elastic Container Service (ECS), Docker Swarm, or the like. In some examples, the cloud management component 246 may transmit a request to the orchestration component 252 to instantiate a new instance, such as instance 248 to run a software application associated with one or more of the services, such as teleoperations component 238, ride management component 240, update component 242, and/or any other service(s) with which a vehicle of the fleet may interact.

The instance 248 may be a virtual machine image that comprises a service software application or a container (e.g., software application containerization and runtime) that executes in the cloud computing system. For example, the instance 248 may be executed by a cluster 254 of node(s) 256 of the cloud computing system 250 or at least one node of the cloud computing system 250. A container may host the service application code and/or the dependencies and/or libraries for that application for the application to run properly, whereas a virtual machine may emulate an entire operating system environment, including the service application. A node of the cloud computing system 250 may be a discrete virtual or physical processing component that executes the instance 248 (e.g., the node may run the virtual machine or container). In some examples, a node may run a single instance or may run multiple instances, such as by running a pod that comprises one or more containers. Additionally or alternatively, a cluster of node(s) may run a single instance or multiple instances.

In some examples, a load balancer of the cloud computing system 250 may determine whether a single node or multiple nodes of a cluster is necessary to handle the computation load for running the service(s), depending on how many requests or connections are being made to the service(s) by the fleet of vehicles. In some examples, the load balancer may assign incoming request/data/connections to a cluster or a respective node of a cluster.

In examples where a cluster 254 or a node of the cluster 254 is associated with metric(s) that indicate hardware and/or network instability (e.g., jitter above a jitter threshold, disk error rate above a disk error rate threshold, ping above a ping threshold, temperature above a temperature threshold, memory leaks above a memory leak threshold) or where the orchestration component 252 or another component of the cloud computing system 250 indicates that a node or cluster is going to experience downtime (e.g., due to planned maintenance on the cluster/node, due to an event such as a physical or networking interruption such as a cybersecurity incident or physical interference with the cloud system), the cloud management component 246 may cause the instance 248 to be migrated to a new cluster 258 and/or node(s) 260 or for the instance 248 to be copied or otherwise newly instantiated on the cluster 258 and/or node(s) 260, according to the techniques discussed herein. For example, the cloud management component 246 may request that migration or other downtime be delayed until a subset of vehicles that is unprepared for the downtime is prepared for the downtime. In some examples, the cloud management component 246 may request that a load balancer maintain connections to the instance running on the cluster 254 and/or node(s) 256 that will experience downtime until a subset of vehicles is prepared for downtime. Additionally or alternatively, the cloud management component 246 may request that the load balancer forward packets received from vehicles of the fleet to the new cluster 258 and/or node(s) 260. In some examples, the cluster 258 and/or node(s) 260 may exist in a same or different cloud region or data center from cluster 254 and/or node(s) 256.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Figure 3:
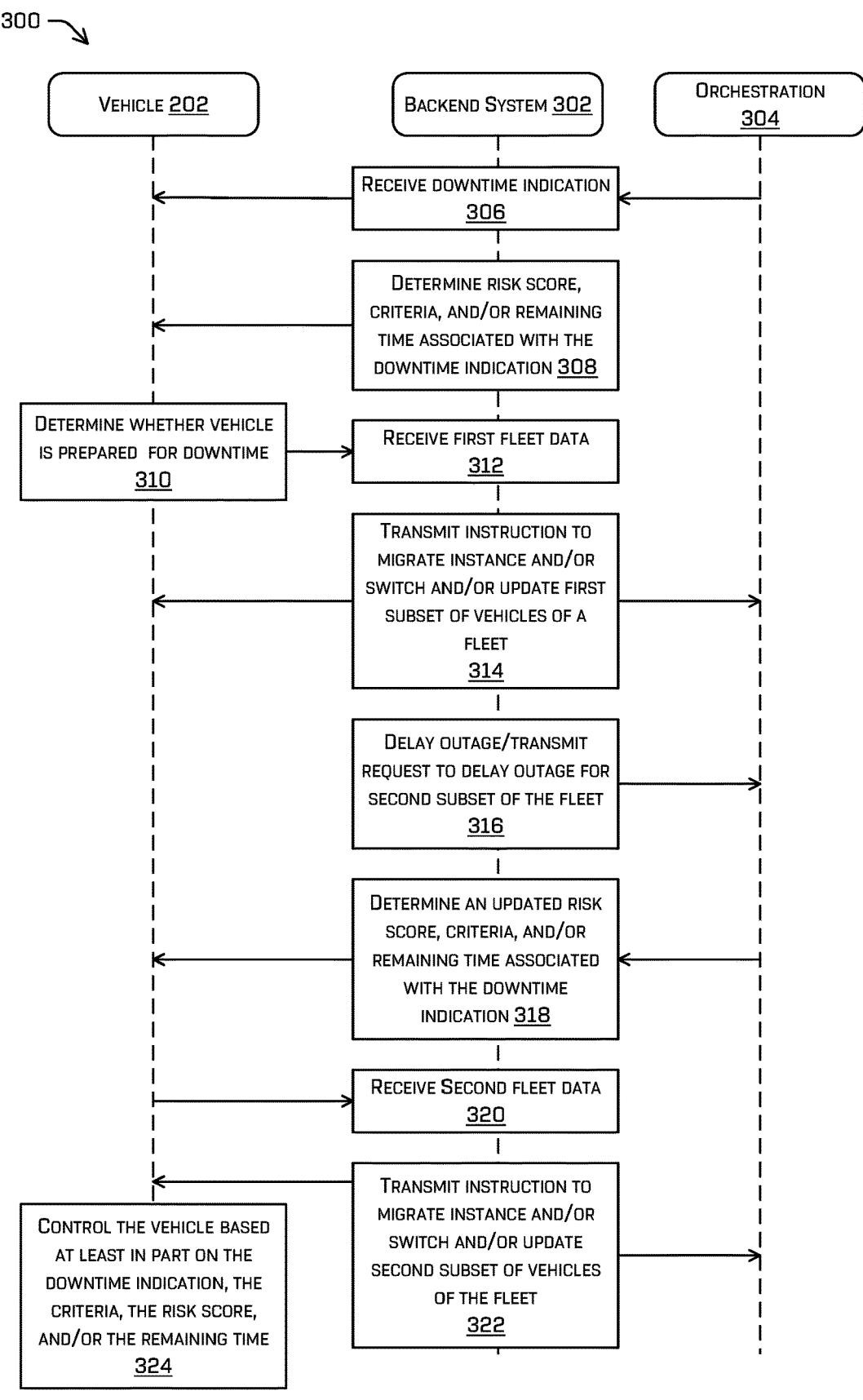
FIG. 3 illustrates a swim lane diagram of an example process for mitigating the impact of cloud service downtime or vehicle updates.

Example Process for Mitigating the Impact of
Downtime or an Update on One or More Vehicles
of a Fleet FIG. 3 illustrates a swim lane diagram of an example process 300 for mitigating the impact of cloud service downtime or a vehicle update on one or more vehicles of a fleet of vehicles. In some examples, example process 300 may be executed by a backend system 302, a vehicle 202 of the vehicle, and/or an orchestration component 304 of a cloud computing system. The backend system 302 may comprise computing device(s) 214 and the orchestration component may comprise the orchestration component 252. In some examples, the process for mitigating the impact of downtime or an update on one or more vehicles of a fleet may differ depending on whether the downtime is due to downtime at the vehicle for installing an update, downtime at a load balancer of the cloud system, or downtime at a computing host of a service to which a vehicle is connected. Those differences are discussed in more detail below.

At operation 306, example process 300 may comprise receiving a downtime indication, according to any of the techniques discussed herein. In some examples, the downtime indication may be received from an orchestration component 304 or another component of the cloud computing system 250, such as a node or cluster monitor, which may comprise sensor(s) and/or software components more monitoring node or cluster performance. In such an example, the downtime may be scheduled to happen in the future, such as for node maintenance or updating, or the downtime may have already occurred due to an unforeseen event, such as a cybersecurity incident, hardware/network failure, hardware/network interference, or the like. In another example, the downtime indication may be generated by the backend system 302 itself, such as when a developer indicates that a software update (e.g., via software installation; modifying or adding a configuration file for a hardware or software component; updating an event(s) file storing traffic data, event data, restricted region data, or the like) is to be pushed to one or more vehicles of the fleet or when the backend system 302 detects network or hardware instability based at least in part on one or more metrics received by the backend system 302 or the cloud computing system 250. For example, the backend system 302 or the cloud computing system 250 may determine that a node or cluster of the cloud computing system 250 may need to be taken offline, a network connection may need to be repaired, or an instance may need to be rebooted based at least in part on determining that a metric indicates instability. For example, the backend system 302 and/or the cloud computing system 250 may determine that a jitter is above a jitter threshold, a disk error rate is above a disk error rate threshold, a ping is above a ping threshold, a temperature is above a temperature threshold, a memory leak is above a memory leak threshold, a software latency is above a latency threshold, an SNR is below an SNR threshold, a hop count is above a hop count threshold, a packet loss rate is above a packet loss rate threshold, a software application in an instance or container has frozen, a bandwidth is below a threshold bandwidth, and/or the like.

In some examples, the downtime indication may include a type of the downtime (e.g., software upgrade, scheduled downtime, unscheduled downtime), a source of the downtime (e.g., at the vehicle due to a software upgrade, a node or cluster of the cloud computing system, a load balancer of the cloud computing system, a network connection (e.g., between a vehicle and the backend system, between a vehicle and the cloud computing system 250, any others), an estimated duration of the downtime, a remaining time until the downtime starts or an indication that the downtime has already started, and/or the like.

At operation 308, example process 300 may comprise determining a risk score, criteria, and/or remaining time associated with the downtime indication, according to any of the techniques discussed herein. For example, determining the risk score may be based at least in part on a duration of the downtime, a time until the downtime takes effect, an effect of the downtime, and/or the like. In some examples, operation 308 may comprise determining a subset of the fleet based at least in part on a type of downtime (e.g., configuration file update, software installation, scheduled or unscheduled cloud service downtime, network/hardware instability, maintenance), an estimated duration of the downtime, etc, and causing the action resulting in the downtime for that subset, such as facilitating/negotiating a new network connection for the subset to a new instance in the cloud computing system 250, instructing the subset to install a software update or patch a configuration file, etc.

In some examples, determining the risk score may comprise determining a weighted sum of one or more of the elements discussed above or a normalization or quantization thereof (e.g., a duration of the downtime could be quantized into 2 or 5-minute segments and indicated by how many 2 or 5-minute segments the downtime represents or the segments could logarithmically increase). In additional or alternate example, a particular type of downtime may be associated with a default risk score that may be modified based at least in part on one or more additional factors, such as the duration of the downtime, time until the downtime, whether the downtime has already occurred, and/or the like. In some examples, the vehicle 202 may determine the risk score based at least in part on sensor data, perception data, and/or map data. Additionally or alternatively, the vehicle 202 may transmit such data to the backend system 302 as part of operation 312 and such data may be used as part of determining the risk score. If the backend system 302 determines the risk score, the backend system 302 may transmit the downtime indication, the risk score, and/or the remaining time until the downtime to any vehicles of the fleet that will be affected by the downtime (e.g., those vehicle(s) that are to be updated, vehicle(s) connected to a service hosted by the cloud computing system). Additionally or alternatively, the backend system 302 may transmit an instruction to the vehicle 202 to execute a software update at the vehicle 202 once the vehicle 202 determines that the vehicle 202 is prepared for downtime according to the risk score and/or criteria. Operation 308 may additionally or alternatively comprise transmitting a software package, event data, and/or configuration file to the vehicle 202 for the vehicle's use as part of a software update. In some examples, the backend system 302 may command a subset of vehicles (e.g., including vehicle 202) to a position and/or mode wherein fleet operation impact may be minimized and/or resources balanced. For example, a subset of vehicles may be identified that will be stopping at a location to await passengers. The backend system 302 may command such a vehicle to spend longer at that location than it normally would. Other examples are contemplated such as: determining vehicles that are transitioning to a maintenance location may be commanded to pull over; vehicles that are at risk of having a deficiency due to not being updated; vehicles that have additional vehicles available in the area to service rides; etc. In examples, these features may be balanced with server side limitations (e.g., bandwidth available to servers; update dependencies such as necessitating a specific previous version; latency to specific vehicles).

Operation 308 may additionally or alternatively comprise determining a criteria for determining whether a vehicle is prepared for the downtime based at least in part on any of the factors discussed above. For example, the criteria may be determined based at least in part on the risk score or any of the factors used to determine the risk score. The criteria may identify a factor or a combination of factors for determining that a vehicle is prepared for downtime due to networking, hardware, update, or other downtime. For example, the criteria may specify that to be indicated as being prepared for the downtime, the vehicle is stopped and/or can remain stopped for the duration of the downtime in a safe location, the vehicle is capable of stopping in a safe location at a time before the remaining time expires, the vehicle location is located outside a region, the vehicle's route (or updated route) does not pass through the region, the vehicle not carrying a passenger, the vehicle not currently interfacing with one or more services hosted by the cloud computing system 250 (e.g., the vehicle 202 is not currently part of a session with a teleoperations device hosted by the cloud computing system 250), the vehicle has detected less than a threshold number of objects or less than a threshold number of objects of a specific object classification, and/or the like.

The criteria may specify any combination of any of these factors or any additional factors as part of the criteria. The criteria may additionally or alternatively specify different combinations of these factors that may be used to indicate that a vehicle is prepared for the downtime and/or may specify, in a combination, whether any factors are optional for determining that the vehicle is prepared for the down-time. For example, the criteria may specify a first combi-nation that specifies that a vehicle is prepared for the downtime if the vehicle is stopped in a safe location (where the safe location is defined by the criteria) and may specify that the vehicle is capable of remaining stopped in the safe location for the duration of the downtime, which may be indicated as optional based at least in part on the risk score being below a risk score threshold. This example criteria may further specify a second combination that specifies that a vehicle is prepared for the downtime if the vehicle is capable of stopping in a safe location before the downtime begins and the vehicle does not contain any passengers. The example criteria may further specify a third combination that specifies that the vehicle is prepared for the downtime if the vehicle is located outside a region and/or the vehicle is capable of reaching a location outside the region before the start of the downtime. In some examples, a criteria may specify a combination of combinations that must be satisfied to indicate that the vehicle is prepared or may indicate that satisfaction of any one combination may be used to indicate that the vehicle is prepared.

In some examples, a safe location may be identified as a location that will not obstruct traffic and/or is associated with a roadway that has a speed limit less than a threshold speed limit. In some examples, a safe location may depend on the estimated duration of the downtime. The criteria may addi-tionally or alternatively specify what is considered a safe location based at least in part on the downtime indication and/or the risk score. For example, the vehicle being stopped at a traffic light may be indicated as being a safe location for a downtime duration of less than 5 or 10 seconds, but may not be indicated as being a safe location for downtime durations beyond 5 or 10 seconds. Other downtime duration thresholds may be used and 5 or 10 seconds are just given as examples. In some examples, the safe location may identify a region in which a vehicle would not be indicated as being prepared, such as a region associated with an elevated safety risk due to complex environmental factors, such as a construction zone, an active event (e.g., a concert, a disaster or environmental hazard), a recently detected number of objects that meets or exceeds a threshold number of objects or a threshold number of objects having a particular object classification (either of which may be deter-mined based at least in part on data received from one or more vehicles of the fleet), a number of teleoperations request originating from vehicle(s) within the region meet-ing or exceeding a threshold number of teleoperations requests within a time period, a rule of the road associated with the region and a time of day, and/or the like.

The backend system 302 may transmit the criteria to any vehicle(s) that may be impacted by the downtime for those vehicle(s) to determine, based at least in part on sensor data, perception data, and/or map data, whether a vehicle is prepared for the downtime. Additionally or alternatively, as discussed below, the backend system 302 may determine whether a vehicle is prepared for the downtime based at least in part on receiving vehicle data from a vehicle as part of receiving fleet data at operation 312.

At operation 310, example process 300 may comprise determining whether a vehicle is prepared for the downtime, according to any of the techniques discussed herein. In some examples, the manner in which operation 310 is carried out may depend on the type of downtime indicated by the downtime indication. For example, the vehicle may carry out operation 310 for examples where the backend system 302 instructs the vehicle 202 to conduct a network change-over, software installation, or other action that will result in downtime once the vehicle 202 determines that the vehicle 202 is prepared for the downtime. In some examples, the vehicle 202 may receive the downtime indication and/or a risk score, criteria, and/or remaining time until the downtime (or an indication that the downtime has already occurred). In some examples, the vehicle 202 may determine whether the vehicle 202 is prepared for the downtime based at least in part on the downtime indication, the risk score, the criteria, and/or the remaining time for other downtime types, such as scheduled downtime of the backend system or a node of the cloud system 250. Additionally or alternatively, the backend system 302 may determine whether the vehicle 202 is prepared for the downtime based at least in part on vehicle data transmitted from the vehicle 202 to the backend system 302 as part of first fleet data at operation 312.

Additionally or alternatively, the entity that determines whether the vehicle 202 is prepared for downtime may depend on network availability and/or bandwidth. For example, if a network connection between the backend system 302 and the vehicle 202 and/or the cloud computing system 250 and the vehicle 202 is the reason for the downtime and/or the network bandwidth is constrained (e.g., SNR is less than an SNR threshold, packet loss meets or exceeds a packet loss rate, ping exceeds a threshold ping, and/or the like), the vehicle 202 may determine whether the vehicle 202 is prepared for the downtime and may execute an action to mitigate an impact of the downtime. In some examples, the vehicle 202 may transmit a report of the vehicle 202's determination of whether it is prepared for the downtime and/or a time until the vehicle 202 is prepared for the downtime.

Regardless, a vehicle may be determined to be prepared or unprepared based at least in part on vehicle state data, the downtime indication, the risk score, the criteria, and/or the remaining time. For example, the vehicle may be determined to be prepared for the downtime if the vehicle state data satisfies the criteria specified by the criteria, as discussed above. In some examples, the vehicle state data may be based at least in part on sensor data, perception data, planning data, and/or map(s) (and the vehicle's position within a map). For example, the vehicle state data may be used to determine whether the vehicle is stopped, where the vehicle is currently located, a current route of the vehicle, an updated route of the vehicle (e.g., as determined to re-route the vehicle outside a region), whether the planning component can plan a trajectory for the vehicle such that the vehicle will reach a safe location before the start of the downtime, and/or the like.

At operation 312, example process 300 may comprise receiving first fleet data from one or more vehicles of a fleet of vehicles, according to any of the techniques discussed herein. A vehicle may transmit vehicle state data and/or a preparedness indication to the backend system 302 as part of the first fleet data responsive to receiving the downtime indication, risk score, criteria, and/or remaining time. In an example where the vehicle 202 determines whether the vehicle is prepared for the downtime, the vehicle 202 may transmit just an indication of whether the vehicle 202 is prepared for the downtime to the backend system 302 or both the preparedness indication and vehicle state data to the backend system (e.g., for the backend system 302 to verify the preparedness of the vehicle 202, for further operations of the backend system 302 discussed below, and/or for auditing). In an example where the backend system 302 determines whether a vehicle is prepared for the downtime, the vehicle 202 may transmit vehicle state data to the backend system 302 for the backend system 302 to determine a preparedness indication for the vehicle 202.

In an example where the backend system 302 instructs the vehicle to take an action once the vehicle 202 determines the vehicle 202 is prepared for downtime according to the risk score and/or criteria, operations 312-322 may be omitted. That action could include, for example, installing a software update, configuring a hardware device, updating a configuration file, changing a network connection from a former cloud-hosted instance to a new cloud-hosted instance, and/or the like.

At operation 314, example process 300 may comprise transmitting an instruction to migrate or create an instance in the cloud computing system 250 and/or switch connections for and/or update a first subset of vehicles of the fleet, according to any of the techniques discussed herein. Operation 314 may be based at least in part on determining a first subset of the vehicles of the fleet that are prepared for the downtime, whether by receiving indication(s) from the first subset of vehicles that the vehicles are prepared for the downtime according to the criteria and/or determining, based at least in part on fleet data and the criteria, that the first subset of vehicles are prepared for the downtime. Transmitting the instruction at operation 314 may differ depending on the downtime indication. For scheduled downtime at the cloud computing system 250 or for an update, operation 314 may comprise transmitting a software update to and/or instructing the first subset of vehicles to install the update or transmitting an indication to the first subset of vehicles to switch network connections from a former instance, cluster, or node, to a new instance, cluster, or node in the cloud computing system 250. Additionally or alternatively, operation 314 may comprise transmitting an instruction to the orchestration component 304 to create a new instance or migrate an instance on a new cluster or node in the cloud computing system for the first subset of vehicles to interact with (e.g., transmit request(s) to and/or receive data from). In some examples, operation 314 may comprise transmitting an instruction to a vehicle or a device connected to the new instance to retransmit any data submitted during or before the migration/instantiation of the new instance within a historical time period.

For downtime that has already occurred, such as a network or hardware problem that has already interfered with the service(s) hosted by the cloud computing system 250, example process 300 may skip operation 316, operation 318, operation 320, and operation 322 and operation 314 may comprise any of the operations above. Additionally or alternatively, in such an example where the downtime has already occurred, operation 314 may transmit instructions to a second subset of vehicles that is not prepared for the downtime to mitigate an impact of the downtime. In some examples, such instructions may include data sufficient to help a vehicle mitigate the impact, such as an estimated duration of the downtime, a proposed alternate route, a proposed operation for controlling the vehicle, a nearest safe location (as determined from vehicle state data received from the vehicle), and/or the like.

Operation 314 may additionally or alternatively comprise transmitting an instruction to an application running on a passenger device to connect to a new instance in the cloud computing system 250. In some examples, operation 314 may additionally or alternatively comprise transmitting an instruction to the application running on the passenger device to resend to the new instance any data transmitted to a former instance within a historical time period.

At operation 316, example process 300 may comprise delaying an outage and/or transmitting a request to delay an outage for a second subset of the fleet, according to any of the techniques discussed herein. The second subset of the fleet may be determined to be unprepared for the downtime based at least in part on the second subset failing to conform to one or more combinations of the criteria. Operation 316 may occur for downtime that is scheduled to occur, such as an update, maintenance of a portion of the network or cloud computing system 250, or the like. If the downtime has already occurred, such as due to an unforeseen event or performance metrics that indicate a critical functionality impediment, operation 316 may still occur but may be ignored by the orchestration component 304 in some cases. Operation 316 may comprise delaying an outage that may result from maintenance at the backend system 302 or that is to be initiated responsive to instructions from the backend system 302. Additionally or alternatively, if the cloud computing system 250 is initiating the downtime, operation 316 may comprise transmitting a request to the orchestration component 304 to delay the action that may result in the downtime.

In some examples, the request may comprise a future time that the backend system 302 requests the downtime to start, which may be more than the remaining time. This future time may be based at least in part on the first fleet data, which may indicate a latest time (or the latest time plus an additional time for safety's sake) at which a vehicle of the second subset will be prepared for the downtime. For example, such a time may be determined based at least in part on a vehicle and/or the backend system 302 estimating the longest time (from among multiple estimated times for the second subset) at which a vehicle will reach a safe location, exit a region, deliver a passenger, or the like to satisfy the criteria for being prepared for the downtime.

Additionally or alternatively, the request may comprise an importance score that indicates an extent of non-conformance of a vehicle to the criteria for preparedness, an average importance score of importance scores associated with the second subset, and/or a maximum importance score from among importance scores associated with the second subset. In some examples, an importance score may be determined based at least in part on vehicle state data received from a vehicle of the second subset, an indication determined by the vehicle of the criterion (a) which the vehicle fails to satisfy, and/or the like. In some examples, the orchestration component 304 may be configured to take into account the importance score in determining whether to take an action that will result in downtime, such as rebooting a node, closing a network connection, depooling a cluster, and/or the like. In some examples, sending the request to the orchestration component 304 may additionally or alternatively comprise requesting that the orchestration component 304 delay shutting down an instance until the backend system 302 sends a confirmation to shut down the instance, e.g., based at least in part on determining the last vehicle of the fleet that wasn't prepared for the downtime is prepared for the downtime (e.g., based at least in part on receiving new vehicle state data and/or fleet data at operation 320).

In an example where all the vehicles of the fleet are prepared for the downtime or will be prepared for the downtime in an amount of time that is less than a time threshold, operation 316 may alternatively comprise transmitting an indication that a pod, container, or instance may be closed.

At operation 318, example process 300 may comprise determining an updated risk score, criteria, and/or remaining time associated with the downtime indication based at least in part on a response of the orchestration component 304, according to any of the techniques discussed herein. For example, the orchestration component 304 may deny a request to delay an action that will result in the downtime or may grant an extension of time that is less than a requested time, in which case operation 318 may determine the updated risk score, criteria, and/or remaining time and may transmit this data to vehicle(s) of the second subset of vehicles that were determined to be unprepared for the downtime. Those vehicle(s) may use this data to mitigate an impact of the downtime on the safety and efficacy of those vehicle(s). In an example where the orchestration component 304 grants an extension of time that meets or exceeds a requested time or indicates that the orchestration component 304 will hold off until the backend system 302 indicates that all the vehicles of the second subset are prepared for the downtime, the original risk score and/or criteria may not need to be updated and the remaining time may be updated to reflect the newly negotiated time or an indication that the vehicle may take a less severe action to mitigate the downtime, such as completing a mission, exiting a region, or the like instead of a more severe action like identifying a nearest safe location and stopping in that location for the duration of the downtime.

At operation 320, example process 300 may comprise receiving second fleet data, according to any of the techniques discussed herein. The second fleet data may comprise vehicle state data for respective one(s) of the vehicles of the second subset received at a time subsequent to the first fleet data and may be used to determine or may indicate that one or more of the vehicles of the second subset are prepared for the downtime.

At operation 322, example process 300 may comprise transmitting an authorization to migrate or shut down an instance and/or switching a network connection of the second subset to a new instance in the cloud computing system 250 and/or transmitting an instruction to the second subset to install an update, according to any of the techniques discussed herein. In some examples, operation 322 may further comprise transmitting an instruction to re-transmit instructions and/or data from a service hosted by the cloud computing system 250 to a vehicle that are indicated as not having been received by the vehicle or that may have been lost by the migration/shutting down of an instance and/or transmitting an instruction to a vehicle to re-transmit data transmitted to the cloud computing system 250 before or during the migration/shutting down of an instance at the cloud computing system 250.

At operation 324, example process 300 may comprise controlling the vehicle 202 based at least in part on the downtime indication, the criteria, the risk score, and/or the remaining time, according to any of the techniques discussed herein. If the vehicle 202 determines, based at least in part on sensor data, perception data, planning data, and/or a map, that the vehicle state satisfies the criteria, the vehicle may determine an operation to maintain its state until the downtime is over, such as remaining stopped or maintaining a route that would keep the vehicle outside a region. The vehicle may also transmit an indication that the vehicle is prepared for the downtime and/or vehicle state data to the backend system 302.

Depending on the criteria, the vehicle 202 may determine that the vehicle is prepared for the downtime by virtue of being able to move to a safe location before the remaining time expires, reroute to keep the vehicle outside a region, or reroute to put the vehicle outside a region by the expiration of the remaining time. In such an instance, the vehicle 202 may determine operation(s) sufficient to re-route the vehicle out of a region or to keep out of a region, to deliver passenger(s), to reach and stop in a safe location, and/or the like.

For vehicles that are unprepared for the downtime according to the criteria or when the downtime has already occurred, operation 324 may comprise mitigating an impact of the downtime, such as by determining a nearest safe location to stop in and controlling the vehicle to stop in the nearest safe location before expiration of the remaining or immediately if the downtime has already occurred, opening a door/aperture of the vehicle, re-routing the vehicle, and/or the like. Operation 324 may comprise determining a combination identified in the criteria that can be achieved by the vehicle 202 soonest and executing operations to achieve a vehicle state that satisfies the combination.

Operation 324 may additionally or alternatively comprise controlling the vehicle 202 based at least in part on the risk score. For example, the planning component of the vehicle 202 may use the risk score to determine whether to complete a mission or to determine a nearest safe location and stop the vehicle 202 in the nearest safe location and/or to open a door/aperture of the vehicle 202 once the safe location has been reached.

In some examples, operation 324 may comprise re-routing a vehicle to delay arrival at a passenger pick-up location, such as by stopping or re-routing the vehicle to take a longer route that will keep the vehicle outside a region.

Figure 4:
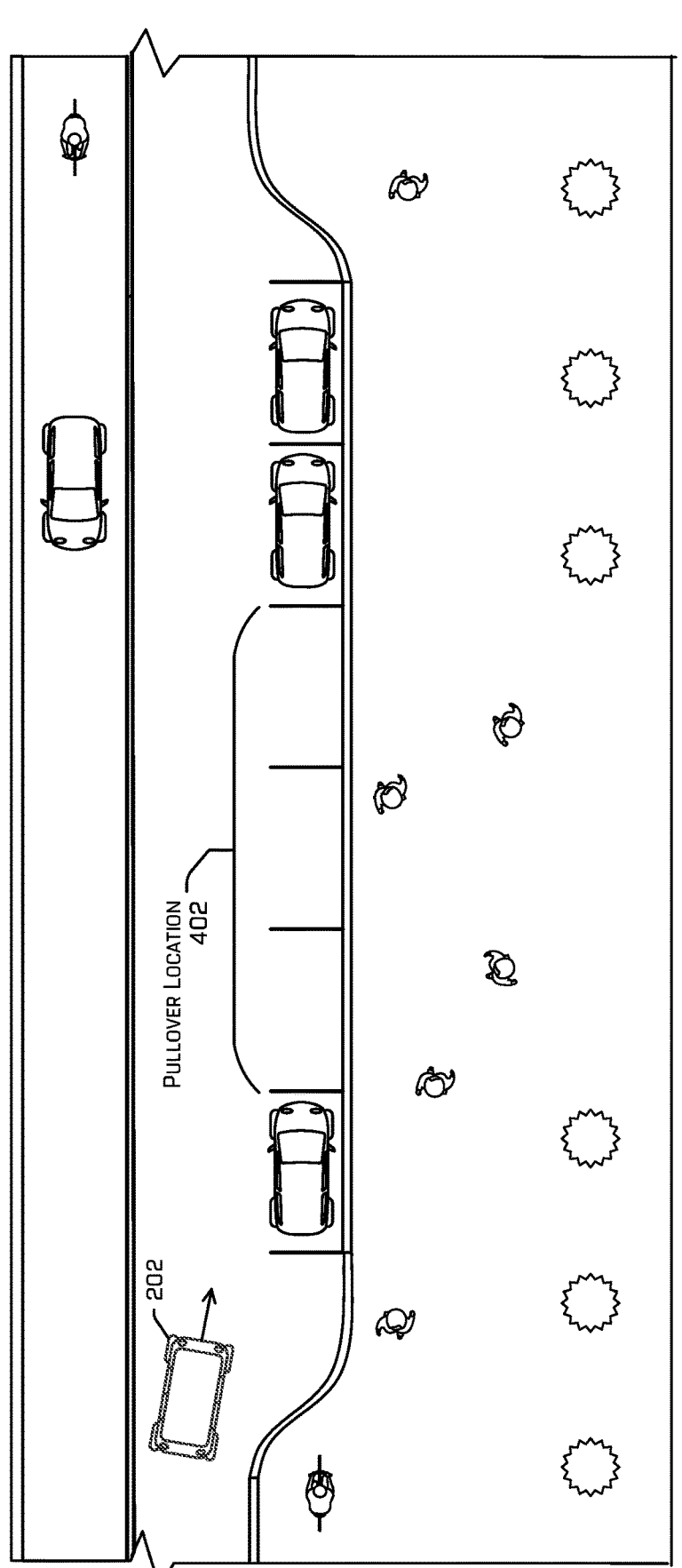
FIG. 4 illustrates a top-down view of example vehicle operations for identifying a safe location and controlling the vehicle to mitigate the impact of cloud service downtime or vehicle updates.

Example Vehicle Preparedness Determination and/or Downtime/Update Impact Mitigation FIG. 4 illustrates a top-down view of an example scenario 400 in which a vehicle 202 determines vehicle operations for identifying a safe location and controlling the vehicle 202 to mitigate the impact of cloud service downtime or vehicle updates. In the example scenario 400, the criteria for a vehicle to be prepared for the downtime may indicate that a safe location is a location where the vehicle will not obstruct traffic and that the vehicle needs to stop in such a safe location for the duration of the downtime. The vehicle 202 may determine that the vehicle 202 is not currently in such a safe location since the vehicle 202 is located in a roadway and may obstruct traffic. In the example scenario 400 the vehicle 202 may also still be moving. The vehicle may determine, based at least in part on sensor data and/or map data that the vehicle 202 can arrive at the pullover location 402, i.e., any of the three parking spaces depicted in FIG. 4, satisfy the criteria as being a safe location to stop. In some examples, the vehicle 202 may additionally or alternatively determine an estimated time by which the vehicle 202 will arrive at one of these parking space and may transmit this estimated time to the backend system 302. In some examples, the vehicle 202 may additionally or alternatively determine whether the vehicle can complete a mission before the remaining time expires by determining an estimated time until the vehicle 202 completes the mission (e.g., arriving at a passenger drop-off location). So long as the estimated time to complete the mission is less than the remaining time until the downtime, the vehicle 202 may continue operate to complete the mission while continuing to determine candidate safe locations to stop as it completes the mission, in case an updated remaining time received from the backend system shrinks or the estimated time to complete the mission was underestimated, in which case the vehicle 202 may control the vehicle 202 to stop in a safe location when the remaining time is less than a threshold amount of time.

Figures 5A, 5B:
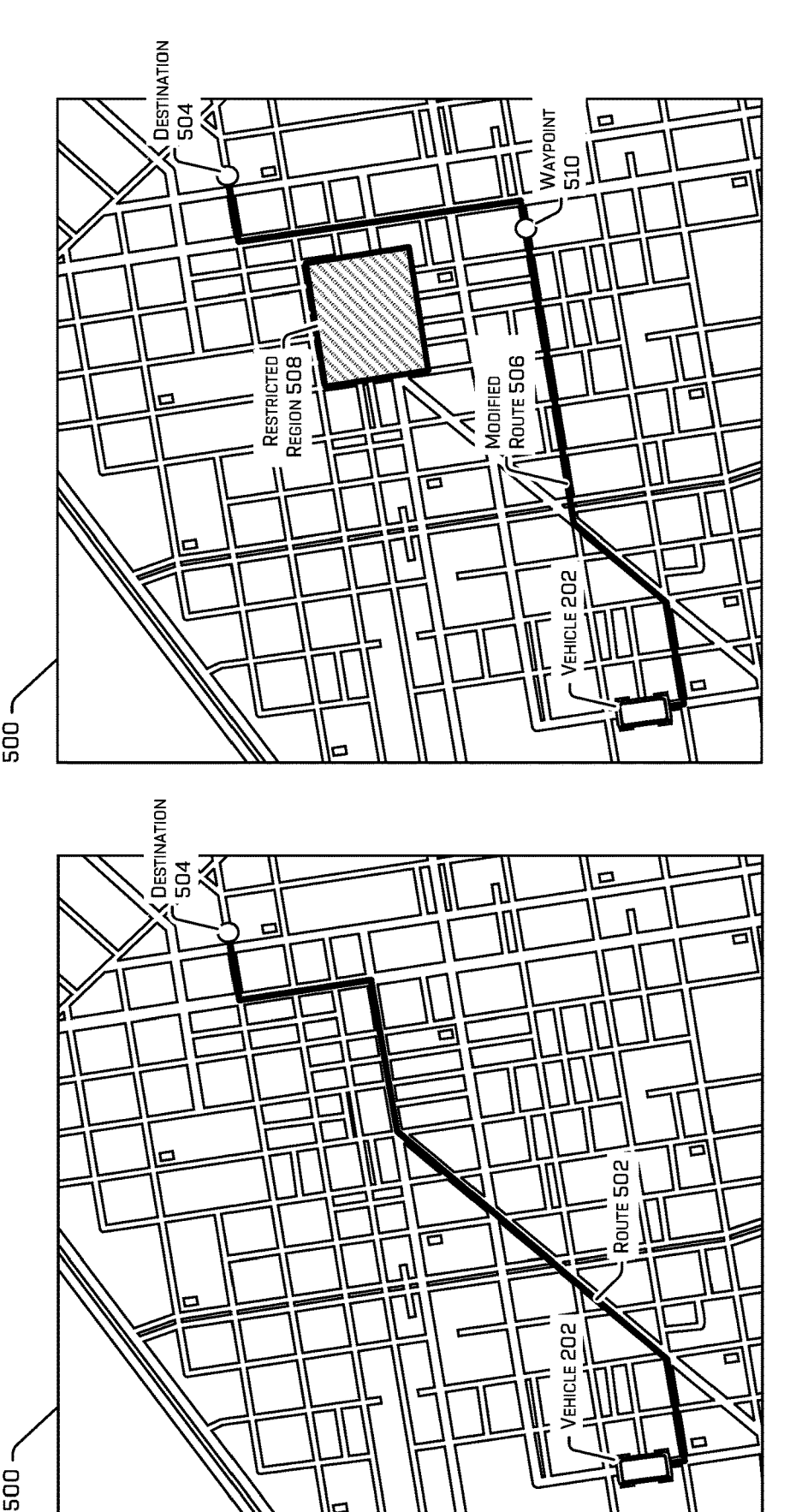
FIGS. 5A and 5B illustrate a top-down view of example vehicle operations for mitigating the impact of cloud service downtime or vehicle updates by re-routing the vehicle.

FIGS. 5A and 5B illustrate a top-down view of example vehicle operations for mitigating the impact of cloud service downtime or vehicle updates by re-routing the vehicle. FIG. 5A depicts a top-down view 500 of a vehicle 202 and a route 502 originally determined by the vehicle 202 for completing a mission, such as dropping off a passenger at a destination 504 or arriving at the destination 504 to pick up a passenger. Based at least in part on receiving a downtime indication, a risk score, criteria for determining preparedness of the vehicle 202 for the downtime, and/or a remaining time until the downtime, the vehicle 202 may determine a modified route 506 for reaching the destination 504. The vehicle 202 may determine the modified route 506 as part of mitigating impact of the downtime route. For example, this modified route 506 may delay arrival at the destination by taking a longer route e.g., to delay picking up a passenger; or may be determined to avoid a restricted region 508. Restricted region 508 may be determined based at least in part on fleet data or event data to be associated with an active event, recent detection(s) of a threshold number of objects or objects having a particular classification by one or more vehicles of the fleet, a classification of roadway (e.g., construction zone), and/or the like. In some examples, determining the modified route 506 may comprise determining a waypoint 510 for the vehicle 202 to reach to elongate the route, avoid the restricted region 508, or the like.

Example Clauses

A. A system comprising: one or more processors; and one or more non-transitory memory storing processor-executable instructions that, when executed by the one or more processors, cause the system to perform operations comprising: receiving an indication that a fleet of vehicles is experiencing or is scheduled to experience downtime based at least in part on software of the fleet of vehicles being scheduled to be updated or a first cloud instance to which the fleet of vehicles is connected is down or is scheduled to be down; receiving first fleet data from a first subset of the fleet indicating the first subset is prepared for the downtime; switching, based at least in part on the first fleet data, the first subset from connecting to the first cloud instance to a second cloud instance or updating software of the first subset; receiving second fleet data from a second subset of the fleet indicating the second subset is unprepared for the downtime; determining, based at least in part on the second fleet data and the indication, a remaining time before the downtime is scheduled to occur; and transmitting the remaining time to the second subset of the fleet, wherein the remaining time is configured to cause a first vehicle of the second subset to mitigate impact of the downtime or to be prepared for the downtime.

B. The system of paragraph A, wherein the first fleet data indicating the first subset is prepared for the downtime includes receiving second vehicle data from a second vehicle indicating at least one of: the second vehicle being stopped; the second vehicle being parked; the second vehicle has not begun a mission or has completed a mission; the second vehicle determining that the second vehicle is scheduled to stop within a time period; the second vehicle detecting less than a first threshold number of total objects or detecting less than a second threshold number of objects detected as being associated with a first object classification; the second vehicle is not carrying a passenger; the second vehicle is not streaming data to or receiving data from one or more services hosted by the first cloud instance; or the second vehicle being located outside a region.

C. The system of paragraph B, wherein the operations further comprise determining the region based at least in part on: historical fleet data indicating at least one of a density of objects detected within the region, a classification of object associated with the region, or at least a threshold number of teleoperation requests originating from vehicles within the region; a classification of roadway associated with the region; or receiving a second indication of an event associated with the region.

D. The system of any one of paragraphs A-C, wherein mitigating impact of the downtime by the first vehicle comprises at least one of: re-routing the first vehicle to a location outside a region or to exclude use of a roadway; re-routing the first vehicle to delay a pick-up; determining a location at which to stop before the remaining time is complete; controlling the vehicle to reach a pickup or drop-off location; or controlling the vehicle to reach a stop location determined by the first vehicle to have a safety score associated therewith that meets or exceeds a safety threshold.

E. The system of any one of paragraphs A-D, wherein the operations further comprise at least one of: receiving a second indication from the first vehicle that the first vehicle determines a first time to be prepared for the downtime within that exceeds the remaining time and transmitting a first request to a cloud orchestrator to delay the downtime until at least the first time; or transmitting a second request to delay the downtime until indications are received from the second subset indicating the second subset is prepared for the downtime.

F. The system of any one of paragraphs A-E, wherein the operations further comprise: receiving second fleet data from the first subset; and determining, based at least in part on the second fleet data, a duration associated with the downtime, wherein the remaining time is based at least in part on the duration or the duration is used to update the remaining time as an updated remaining time.

G. The system of any one of paragraphs A-F, wherein the operations further comprise transmitting a notification to at least one of a teleoperations device or a ride management device indicating at least one of an outage, the remaining time, or an estimated duration of the outage.

H. The system of any one of paragraphs A-G, wherein the operations further comprise: determining, based at least in part on the indication, a level of risk associated with the downtime; determining, based at least in part on the level of risk, a criterion for determining what vehicle parameters qualify as being prepared for an outage; and transmitting the criterion to the fleet of vehicles.

I. The system of any one of paragraphs A-H, wherein the operations further comprise: delaying switching the second subset from connecting to the first cloud instance or updating software associated with the second subset based at least in part on receiving the second fleet data from indicating the second subset is unprepared for the downtime; and switching a third subset of the fleet of vehicles from connecting to the first cloud instance to a second cloud instance or updating software of the third subset.

J. One or more non-transitory computer-readable media storing processor-executable instructions that, when executed by one or more processors, perform operations comprising: receiving an indication that a vehicle is experiencing or is scheduled to experience downtime; determining, based at least in part on the indication, a criterion indicating a minimum vehicle state for the vehicle to be prepared for the downtime; determining, based at least in part on sensor data received by the vehicle, a vehicle state associated with the vehicle; and causing control of the vehicle based at least in part on the criterion and the vehicle state data.

K. The one or more non-transitory computer-readable media of paragraph J, wherein the downtime is due to software of the vehicle being scheduled to be updated or due to a first cloud instance to which the vehicle is connected being down or being scheduled to be down.

L. The one or more non-transitory computer-readable media of either paragraph J or K, wherein the criterion indicates at least one of: a state of movement of the vehicle; one or more objects detected by the vehicle; a classification of an object detected by the vehicle; a mission state of the vehicle indicating progress of the vehicle in completing a mission; the vehicle is not carrying a passenger; the vehicle is not streaming data to or receiving data from a service hosted by a server; or the vehicle being outside a region.

M. The one or more non-transitory computer-readable media of any one of paragraphs J-L, wherein causing control of the vehicle based at least in part on the criterion and the vehicle state data comprises transmitting to the vehicle an instruction to update software of the vehicle or switch a network connection from a first instance in a cloud computing system to a second instance in the cloud computing system once the vehicle determines that the criterion is satisfied.

N. The one or more non-transitory computer-readable media of any one of paragraphs J-M, wherein the operations further comprise: determining the vehicle state based at least in part on at least one of the sensor data or map data; determining that the vehicle state of the vehicle does not satisfy the criterion; and transmitting, to a cloud computing system, a request to delay the downtime.

O. The one or more non-transitory computer-readable media of any one of paragraphs J-N, wherein causing control of the vehicle based at least in part on the criterion and the vehicle state data comprises: determining a first new route to route the vehicle to a location outside a region or to exclude use of an identified roadway; determining a second new route to route the vehicle to delay a pick-up; determining a location at which to stop the vehicle before remaining time associated with the downtime is complete; controlling the vehicle to reach a pickup or drop-off location; or controlling the vehicle to reach a safe location determined based at least in part on the criterion.

P. The one or more non-transitory computer-readable media of any one of paragraphs J-O, wherein the vehicle is a first vehicle and the operations further comprise: receiving, from a second vehicle, a duration associated with the downtime; and transmitting the duration to the first vehicle.

Q. The one or more non-transitory computer-readable media of paragraph K, wherein the operations further comprise: determining, based at least in part on the vehicle state, that the vehicle is prepared for the downtime; creating a new instance in a cloud computing system to replace a former instance associated with the downtime; and causing the vehicle to connect to the new instance.

R. A method comprising: receiving an indication that a vehicle is experiencing or is scheduled to experience downtime; determining, based at least in part on the indication, a criterion indicating a minimum vehicle state for the vehicle to be prepared for the downtime; determining, based at least in part on sensor data received by the vehicle, a vehicle state associated with the vehicle; and causing control of the vehicle based at least in part on the criterion and the vehicle state data.

S. The method of paragraph R, wherein the downtime is due to software of the vehicle being scheduled to be updated or due to a first cloud instance to which the vehicle is connected being down or being scheduled to be down.

T. The method of either paragraph R or S, wherein the criterion indicates at least one of: a state of movement of the vehicle; one or more objects detected by the vehicle; a classification of an object detected by the vehicle; a mission state of the vehicle indicating progress of the vehicle in completing a mission; the vehicle is not carrying a passenger; the vehicle is not streaming data to or receiving data from a service hosted by a server; or the vehicle being outside a region.

U. The method of any one of paragraphs R-T, wherein causing control of the vehicle based at least in part on the criterion and the vehicle state data comprises transmitting to the vehicle an instruction to update software of the vehicle or switch a network connection from a first instance in a cloud computing system to a second instance in the cloud computing system once the vehicle determines that the criterion is satisfied.

V. The method of any one of paragraphs R-U, wherein the operations further comprise: determining the vehicle state based at least in part on at least one of the sensor data or map data; determining that the vehicle state of the vehicle does not satisfy the criterion; and transmitting, to a cloud computing system, a request to delay the downtime.

W. The method of any one of paragraphs R-V, wherein causing control of the vehicle based at least in part on the criterion and the vehicle state data comprises: determining a first new route to route the vehicle to a location outside a region or to exclude use of an identified roadway; determining a second new route to route the vehicle to delay a pick-up; determining a location at which to stop the vehicle before remaining time associated with the downtime is complete; controlling the vehicle to reach a pickup or drop-off location; or controlling the vehicle to reach a safe location determined based at least in part on the criterion.

While the example clauses described above are described with respect to one particular implementation, it should be understood that, in the context of this document, the content of the example clauses can also be implemented via a method, device, system, computer-readable medium, and/or another implementation. Additionally, any of examples A-W may be implemented alone or in combination with any other one or more of the examples A-W.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Such processes, or any portion thereof, may be performed iteratively in that any or all of the steps may be repeated. Of course, the disclosure is not meant to be so limiting and, as such, any process performed iteratively may comprise, in some examples, performance of the steps a single time.

Criteriaal language such as, among others, "may," "could," "may" or "might," unless specifically stated otherwise, are understood within the context to indicate that certain examples include, while other examples do not include, certain features, elements and/or steps. Thus, such criteriaal language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural. When referring to a collection of item as a "set," it should be understood that the definition may include, but is not limited to, the common understanding of the term in mathematics to include any number of items including a null set (0), 1, 2, 3, . . . up to and including an infinite set.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory memory storing processor-executable instructions that, when executed by the one or more processors, cause the system to perform operations comprising:
   receiving an indication that a fleet of vehicles is experiencing or is scheduled to experience downtime based at least in part on software of the fleet of vehicles being scheduled to be updated or a first cloud instance to which the fleet of vehicles is connected is down or is scheduled to be down;
   receiving first fleet data from a first subset of the fleet indicating the first subset is prepared for the downtime;
   switching, based at least in part on the first fleet data, the first subset from connecting to the first cloud instance to a second cloud instance or updating software of the first subset;
   receiving second fleet data from a second subset of the fleet indicating the second subset is unprepared for the downtime;
   determining, based at least in part on the second fleet data and the indication, a remaining time before the downtime is scheduled to occur; and
   transmitting the remaining time to the second subset of the fleet, wherein the remaining time is configured to cause a first vehicle of the second subset to mitigate impact of the downtime or to be prepared for the downtime.

2. The system of claim 1, wherein the first fleet data indicating the first subset is prepared for the downtime includes receiving second vehicle data from a second vehicle indicating at least one of:
   the second vehicle being stopped;
   the second vehicle being parked;
   the second vehicle has not begun a mission or has completed a mission;
   the second vehicle determining that the second vehicle is scheduled to stop within a time period;

the second vehicle detecting less than a first threshold number of total objects or detecting less than a second threshold number of objects detected as being associated with a first object classification;

the second vehicle is not carrying a passenger;

the second vehicle is not streaming data to or receiving data from one or more services hosted by the first cloud instance; or the second vehicle being located outside a region.

3. The system of claim 2, wherein the operations further comprise determining the region based at least in part on:

historical fleet data indicating at least one of a density of objects detected within the region, a classification of object associated with the region, or at least a threshold number of teleoperation requests originating from vehicles within the region;

a classification of roadway associated with the region; or receiving a second indication of an event associated with the region.

4. The system of claim 1, wherein mitigating impact of the downtime by the first vehicle comprises at least one of:

re-routing the first vehicle to a location outside a region or to exclude use of a roadway;

re-routing the first vehicle to delay a pick-up;

determining a location at which to stop before the remaining time is complete;

controlling the first vehicle to reach a pickup or drop-off location; or controlling the first vehicle to reach a stop location determined by the first vehicle to have a safety score associated therewith that meets or exceeds a safety threshold.

5. The system of claim 1, wherein the operations further comprise at least one of:

receiving a second indication from the first vehicle that the first vehicle determines a first time to be prepared for the downtime within that exceeds the remaining time and transmitting a first request to a cloud orchestrator to delay the downtime until at least the first time; or transmitting a second request to delay the downtime until indications are received from the second subset indicating the second subset is prepared for the downtime.

6. The system of claim 1, wherein the operations further comprise:

receiving third fleet data from the first subset; and determining, based at least in part on the third fleet data, a duration associated with the downtime, wherein the remaining time is based at least in part on the duration or the duration is used to update the remaining time as an updated remaining time.

7. One or more non-transitory computer-readable media storing processor-executable instructions that, when executed by one or more processors, perform operations comprising:

receiving an indication that a fleet of vehicles is experiencing or is scheduled to experience downtime based at least in part on software of the fleet of vehicles being scheduled to be updated or a first cloud instance to which the fleet of vehicles is connected is down or is scheduled to be down;

receiving first fleet data from a first subset of the fleet indicating the first subset is prepared for the downtime;

switching, based at least in part on the first fleet data, the first subset from connecting to the first cloud instance to a second cloud instance or updating software of the first subset;

receiving second fleet data from a second subset of the fleet indicating the second subset is unprepared for the downtime;

determining, based at least in part on the second fleet data and the indication, a remaining time before the downtime is scheduled to occur; and transmitting the remaining time to the second subset of the fleet, wherein the remaining time is configured to cause a first vehicle of the second subset to mitigate impact of the downtime or to be prepared for the downtime.

8. The one or more non-transitory computer-readable media of claim 7, wherein the first fleet data indicating the first subset is prepared for the downtime includes receiving second vehicle data from a second vehicle indicating at least one of:

the second vehicle being stopped;

the second vehicle being parked;

the second vehicle has not begun a mission or has completed a mission;

the second vehicle determining that the second vehicle is scheduled to stop within a time period;

the second vehicle detecting less than a first threshold number of total objects or detecting less than a second threshold number of objects detected as being associated with a first object classification;

the second vehicle is not carrying a passenger;

the second vehicle is not streaming data to or receiving data from one or more services hosted by the first cloud instance; or the second vehicle being located outside a region.

9. The one or more non-transitory computer-readable media of claim 8, wherein the operations further comprise determining the region based at least in part on:

historical fleet data indicating at least one of a density of objects detected within the region, a classification of object associated with the region, or at least a threshold number of teleoperation requests originating from vehicles within the region;

a classification of roadway associated with the region; or receiving a second indication of an event associated with the region.

10. The one or more non-transitory computer-readable media of claim 8, wherein the operations further comprise:

determining that the second vehicle is prepared for the downtime;

creating a new instance in a cloud computing system to replace a former instance associated with the downtime; and causing the second vehicle to connect to the new instance.

11. The one or more non-transitory computer-readable media of claim 7, wherein mitigating impact of the downtime by the first vehicle comprises at least one of:

re-routing the first vehicle to a location outside a region or to exclude use of a roadway;

re-routing the first vehicle to delay a pick-up;

determining a location at which to stop before the remaining time is complete;

controlling the first vehicle to reach a pickup or drop-off location; or controlling the first vehicle to reach a stop location determined by the first vehicle to have a safety score associated therewith that meets or exceeds a safety threshold.

12. The one or more non-transitory computer-readable media of claim 7, wherein the operations further comprise at least one of:

receiving a second indication from the first vehicle that the first vehicle determines a first time to be prepared for the downtime within that exceeds the remaining time and transmitting a first request to a cloud orchestrator to delay the downtime until at least the first time; or transmitting a second request to delay the downtime until indications are received from the second subset indicating the second subset is prepared for the downtime.

13. The one or more non-transitory computer-readable media of claim 7, wherein the operations further comprise:

receiving third fleet data from the first subset; and determining, based at least in part on the third fleet data, a duration associated with the downtime, wherein the remaining time is based at least in part on the duration or the duration is used to update the remaining time as an updated remaining time.

14. A method comprising:

receiving an indication that a fleet of vehicles is experiencing or is scheduled to experience downtime based at least in part on software of the fleet of vehicles being scheduled to be updated or a first cloud instance to which the fleet of vehicles is connected is down or is scheduled to be down;

receiving first fleet data from a first subset of the fleet indicating the first subset is prepared for the downtime;

switching, based at least in part on the first fleet data, the first subset from connecting to the first cloud instance to a second cloud instance or updating software of the first subset;

receiving second fleet data from a second subset of the fleet indicating the second subset is unprepared for the downtime;

determining, based at least in part on the second fleet data and the indication, a remaining time before the downtime is scheduled to occur; and transmitting the remaining time to the second subset of the fleet, wherein the remaining time is configured to cause a first vehicle of the second subset to mitigate impact of the downtime or to be prepared for the downtime.

15. The method of claim 14, wherein the first fleet data indicating the first subset is prepared for the downtime includes receiving second vehicle data from a second vehicle indicating at least one of:

the second vehicle being stopped;

the second vehicle being parked;

the second vehicle has not begun a mission or has completed a mission;

the second vehicle determining that the second vehicle is scheduled to stop within a time period;

the second vehicle detecting less than a first threshold number of total objects or detecting less than a second threshold number of objects detected as being associated with a first object classification;

the second vehicle is not carrying a passenger;

the second vehicle is not streaming data to or receiving data from one or more services hosted by the first cloud instance; or the second vehicle being located outside a region.

16. The method of claim 15, further comprising determining the region based at least in part on:

historical fleet data indicating at least one of a density of objects detected within the region, a classification of object associated with the region, or at least a threshold number of teleoperation requests originating from vehicles within the region;

a classification of roadway associated with the region; or receiving a second indication of an event associated with the region.

17. The method of claim 15, further comprising:

determining that the second vehicle is prepared for the downtime;

creating a new instance in a cloud computing system to replace a former instance associated with the downtime; and causing the second vehicle to connect to the new instance.

18. The method of claim 14, wherein mitigating impact of the downtime by the first vehicle comprises at least one of:

re-routing the first vehicle to a location outside a region or to exclude use of a roadway;

re-routing the first vehicle to delay a pick-up;

determining a location at which to stop before the remaining time is complete;

controlling the first vehicle to reach a pickup or drop-off location; or controlling the first vehicle to reach a stop location determined by the first vehicle to have a safety score associated therewith that meets or exceeds a safety threshold.

19. The method of claim 14, further comprising at least one of:

receiving a second indication from the first vehicle that the first vehicle determines a first time to be prepared for the downtime within that exceeds the remaining time and transmitting a first request to a cloud orchestrator to delay the downtime until at least the first time; or transmitting a second request to delay the downtime until indications are received from the second subset indicating the second subset is prepared for the downtime.

20. The method of claim 14, further comprising:

receiving third fleet data from the first subset; and determining, based at least in part on the third fleet data, a duration associated with the downtime, wherein the remaining time is based at least in part on the duration or the duration is used to update the remaining time as an updated remaining time.

* * * * *